United States Patent [19]

White

[11] 4,054,426
[45] Oct. 18, 1977

[54] THIN FILM TREATED DRILLING BIT CONES

[76] Inventor: Gerald W. White, 5835 Elm Lawn St., Dallas, Tex. 75223

[21] Appl. No.: 575,260

[22] Filed: May 7, 1975

Related U.S. Application Data

[63] Continuation of Ser. No. 316,811, Dec. 20, 1972, abandoned.

[51] Int. Cl.$^2$ .................. B24D 3/06; C23C 15/00
[52] U.S. Cl. ..................... 51/309 R; 51/293; 204/192 SP; 204/298
[58] Field of Search ............ 51/293, 309; 204/298, 204/192

[56] References Cited

U.S. PATENT DOCUMENTS

| | | | |
|---|---|---|---|
| 2,660,405 | 11/1953 | Scott et al. | 51/309 |
| 2,833,638 | 5/1958 | Owen | 51/293 |
| 3,329,601 | 7/1967 | Mattox | 204/298 |
| 3,453,719 | 7/1969 | Feenstra | 51/309 |
| 3,488,892 | 1/1970 | Benner et al. | 51/309 |

*Primary Examiner*—Donald J. Arnold
*Attorney, Agent, or Firm*—Warren H. Kintzinger

[57] ABSTRACT

A thin film treatment of rock formation drilling bits mounting a plurality of toothed rotatably mounted cones with cones having hard surface films deposited on the outer surface by a high particulate energy level ion plating process on the cone carrier material including the cone teeth. Bearing surfaces within the cones and, in most instances, the bearing surfaces of bearing journals of the bit arm journal and bearing roller and ball components as well are given a dry lubricant thin film plating deposited by a high particulate energy level ion plating process.

22 Claims, 8 Drawing Figures

U.S. Patent   Oct. 18, 1977   4,054,426
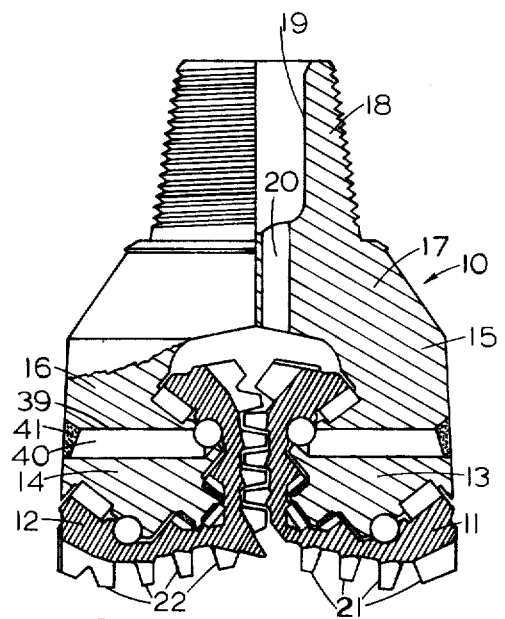
FIG. 1.
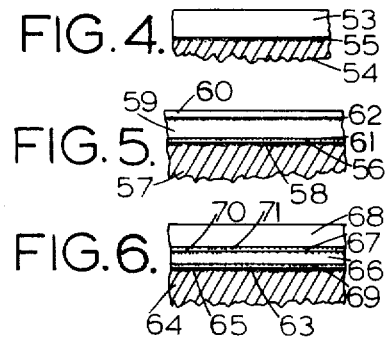
FIG. 4.
FIG. 5.
FIG. 6.
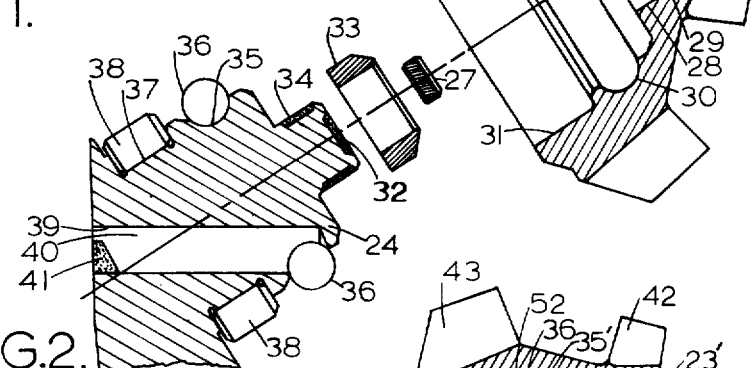
FIG. 2.
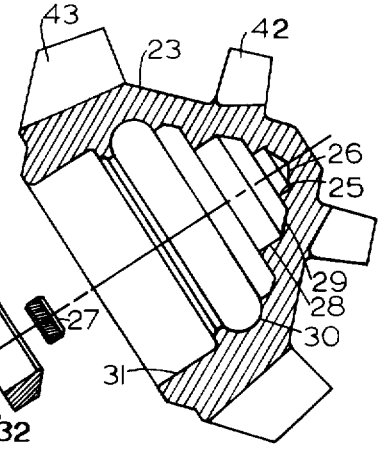
FIG. 3.
FIG. 7.
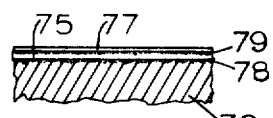
FIG. 8.

THIN FILM TREATED DRILLING BIT CONES

This is a continuation of application Ser. No. 316,811, filed Dec. 20, 1972 and now abandoned.

This invention relates in general to rolling cutter bits and, in particular, to thin film treated drilling bit roller cones with ion plating process deposited outer hard surfaces and high particulate energy level deposited dry lubricant thin film surfaces on internal bearing surfaces. Ref. of Int. U.S. Pat. No. 3,329,601 Mattox.

Conventional rock formation rolling cutter drilling bits consist of a plurality of toothed conically shaped units rotatably mounted on bearing journals of a metal yoke having an upper threaded pin for mounting at the bottom end of a drill string. The drilling bit cones are mounted so that they each rotate as the drill bit is turned by the drill stem. Impact of hard cone teeth on rock causes the rock to fracture into cutting fragments usually carried up the drill hole to the surface by drilling fluid circulation. There are at least two features that are very important in the attainment of a well designed drill bit cone. One of these is hardness of cutting teeth for better penetration into hard rock formation and increased bit cone life. The second feature is the need for improved lubricity on inner bearing surfaces of drill bit cones for longer bearing life in rotation of the cones on their journal mountings so that the bearings may give satisfactory service generally as long as the cone drill teeth are serviceable in a balanced design. In the effort to attain surface hardness, sections of hard material such as sintered tungston carbide or diamonds have been mounted on drill bit cones. Some of this has been accomplished through attachments in the form of inserts or coatings applied by thermal diffusion methods such as flame spraying or welding with binary carbides normally used for the hard material. Actually heretofore these have been in reality cermets composed of binary carbide grains cemented into a hot pressed matrix by various metal binders such as nickel or cobalt. With these structures the metal phases present the first disadvantageous approach opportunity for both chemical and physical failure of such hardened surfaces. This is so since the metal phase is softer than the binary carbide grain inclusions, and is, by comparison, also more readily attacked chemically. Chemically induced and thermo-chemical induced failure of hardened surfaces while significant in actual service has been overlooked as a major contributing failure factor in many instances. Exposure to ambient reagents occurs at the outer atomic surface where the thermal effects from physical impact are most intense. Thus, cutting tools should not only exhibit a surface hardness everywhere greater than that of the material being cut, but also have chemical stability in outer atomic surfaces under high temperature impact operating conditions.

Lubricity is essential to reasonable life for bearings supporting rotating drill bit cones with smoothly machined surfaces, good quality bearings, debris seals, and both organic and metal lubricants employed to prevent bearing failure. Materials used for lubricating surfaces include metals such as gold, silver, lead and tin, layered lattice inorganic compounds such as molybdenum disulphide, and polymers such as Teflon and nylon. Organic lubricant absorbed films commonly used for conventional lubrication allow slippage between moving parts by providing shearing action and floating support as long as they are not thermally destroyed or physically displaced. After an absorbed film is penetrated, reaction films such as metal oxide if present, continue to provide slippage until penetrated when welding of active surfaces in contact begins with resulting destruction of mating surfaces. With thin surface films a critical factor in providing low friction and high lubricity it is very advantageous that the thin films be intensely bonded to the base metal. This is with thin film material phased into the surface of the base metal as an integral part of the substrate atomic lattice and of uniform coverage and thickness such as attained by a high energy deposition of atomic sized particles of the desired functional material. Molybdenum disulphide may be deposited by such manner in a thin film directly on base metal, or chromium and then gold deposited successively in thin filming for optimized lubricity between mating bearing surfaces.

It is, therefore, a principal object of this invention to provide thin film treated drilling bit cones having hard surface films deposited on outer surfaces by a high particulate energy level ion plating process.

Another object with such thin film treated drilling bit cones is to increase drill penetration rates and service life.

A further object is to provide such drilling bit cones with the base metal tempered steel for ductility and shock resistance plated with an ion process deposited film for minimizing chemical and physical failure.

Another object is to provide thin films on bearing surfaces for drilling bit cones of high lubricity material phased into the base metal of the cone or an intervening thin film also phased into the base metal of the cone as an integral part of the substrate atomic lattice.

Still a further object of such thin film treated bearing surfaces is the attainment of much longer bearing life in the harsh environment of hard rock drilling with a well balanced drill design.

Another object of such thin film treated bearing surfaces is the attainment of a friction bearing system without roller bearings required in bearing support of drill bit roller cones.

Features of the invention useful in accomplishing the above objects include, in thin film treated bit cones, an outer dense hard smooth film surface with a phase zone of atoms extended into underlying base metal or intervening films of material all deposited by a high particulate energy level ion plating process. The drilling bit cones including the teeth thereof are made with the base metal tempered steel for ductility and shock resistance plated with ion process deposited hard film for minimizing chemical and physical failure. Internal bearing surfaces within the cones and bearing surfaces of bearing journals of the bit arm journal and bearing roller and ball components as well are given a dry lubricant thin film plating deposited by a high particulate energy level sputtering or ion plating process.

Specific embodiments representing what are presently regarded as the best modes of carrying out the invention are illustrated in the accompanying drawing:

In the drawing:

FIG. 1 represents a two-cone rolling cutter bit partially cut away and sectioned with cone outer surfaces thin film treated by an ion plating process and bearing surfaces having a dry lubricant thin film plating deposited by a high particulate energy level sputtering or ion plating process;

FIG. 2, a partially exploded sectional view with the front half lifted away of the shirt-tail portion of a arm of three-cone roller cutter bit, a bearing journal, and a roller bit cone;

FIG. 3, a sectional view with the front half lifted away of the shirt tail portion of a three-cone roller cutter bit arm, and a cone rotatably mounted by a friction journal bearing;

FIG. 4, an enlarged partial section showing a single hard smooth material film layer deposited on outer cone surfaces by a high particulate energy level ion plating process with a phase zone of atom penetration into cone base metal;

FIGS. 5 and 6; enlarged partial sections showing a plurality of film layers deposited successively over drill bit cone outer base metal surfaces by high particulate energy level ion plating processes with a phase zone of atom penetration into cone base metal and each film layer by the next higher layer;

FIG. 7, an enlarged partial section showing a single thin film layer of dry lubricant film plating deposited on bearing surfaces of base metal by a high particulate energy level sputtering or ion plating process; and, FIG. 8, an enlarged partial section of a plurality of film layers deposited successively over bearing surfaces of base metal by a high particulate energy level sputtering or ion plating process and with the highest layer a thin film of dry lubricant material.

Referring to the drawing:

The two-cone rolling cutter drill bit 10 of FIG. 1 is shown to have two roller cutter cones 11 and 12 rotatably mounted on bearing journal arms 13 and 14, respectively, of right and left arms 15 and 16 of drill bit body yoke 17. Yoke 17 is provided with an upper threaded pin 18 for mounting at the bottom end of a drill stem (not shown) that is hollow for the feeding of drilling fluids to and through pin opening 19 and yoke openings 20 for cleaning the drill bit cones 11 and 12 and carrying drill cutting fragments up the drill hole. The roller cutter cones 11 and 12 have hard core teeth 21 and 22 in annular rows in self-cleaning interspaced relation. Each of the cones 11 and 12 and also drill bit cone 23 of FIG. 2 that is designed to be rotatably mounted on bearing journal arm 24 of a three-cone rolling cutter drill bit are shaped to be rotatably mounted on its bearing journal arm by a multi-segment bearing structure. This includes a thrust button seat 26 for receiving a thrust button 27, a friction bushing bore 28 with a friction bushing seat 29, a ball bearing race 30, and a roller bearing race 31. The respective bearing journal arm 13, 14 or 24 is provided with an end friction thrust button engaging thrust bearing surface insert 32, an annular friction bushing 33 engaging bearing surface insert 34, a ball race 35 for ball bearings 36, and a roller bearing race 37 for roller bearings 38. The drill bit cones 11, 12 and 23 are assembled for mounting on their bearing journal arms 13, 14 and 24 with the thrust button 27 and friction bushing 33 pressed in place, the bearing inserts 32 and 34 in place on the journal arm and with bearing rollers 38 held in place as the cone is placed on its bearing journal arm. Then balls 36 are inserted through ball loading hole 39 and act to retain the drill bit cone 11, 12 or 23 in place on its bearing journal arm 13, 14 or 24 with hole 39 closed by a ball retaining plug 40 welded 41 in place. While cones 11 and 12 are shown to have at least four annular rows of teeth drill bit cone 23 and cone 23' of FIG. 3 are each shown to have two annular rows of teeth 42 and 43.

With the drill bit embodiment of FIG. 3 drill bit roller cone 23' is substantially the same on the outside as the cone 23 of FIG. 2 even to having the same annular rows of teeth 42 and 43. Bearing support for cone 23' however, is different with journal bearing arm 44 providing friction journal bearing support for cone 23'. This is with the larger diameter surface 45 providing journal bearing support to journal bearing bore surface 46 of cone 23', smaller diameter surface 47 of journal bearing arm 44 extension 48 also providing journal bearing support to journal bearing bore surface 49 of cone 23', and with the outer end surface 50 of extension 48 providing thrust bearing contact for thrust bearing surface 51 of cone 23'. Bearing balls 36 in journal bearing arm race 35' and cone race 52 serve to retain the cone 23' in position on journal bearing arm 44 and are not intended to provide any material radial bearing support. With this friction journal bearing both the journal bearing arm 44 and the cone 23' may be structurally stronger units with more volume of support metal than with other bearing support designs for roller bit cones. The friction journal bearing system presents a larger contact area at the load bearing point and eliminates roller bearing spalling of the load sector of a bearing journal a major cause of roller bearing failure.

All of the drill bit cones 21, 22, 23 and 23' are provided with an outer dense hard smooth film surface and a phase zone of atoms extended into underlying base metal including the teeth. The phase zone is attained through atoms penetration into the surface region of the base metal with high particulate energy level in a ion plating process sufficient to drive many atoms into substrate atomic lattice. This is quite advantageous with, for example, drilling bit cones including the teeth being tempered steel for ductility and shock resistance plated with ion process deposited hard film for minimized chemical and physical failure. Another advantage provided with the attainment of a surface region phase zone of penetration atoms is stress relieval of base metal through the phase zone and development of an advantageous surface material compressive state.

FIG. 4 shows in enlarged partial section a single hard smooth material film layer 53 that is in some instances hafnium carbide deposited to as much as 0.1 to 5 mils thickness on the base material 54 over the outside of the cone including the cone teeth. A film layer 53 of hafnium carbide has been deposited over steel as the base material 54 by a high particulate energy level ion plating process providing a phase zone 55 of atom penetration into cone base material. This hard film layer along with the phase zone advantageously so improves hardened outer drill bit surfaces as to increase drill penetration rates and materially increase drill service life.

With the surface treatment of FIGS. 5 and 6 a plurality of film layers are deposited successively over drill bit cone outer base metal surfaces by high particulate energy level ion plating processes. In the instance of FIG. 5 a titanium layer 56 is deposited first over the base metal 57 to a thickness of approximately 2,000 angstroms with a phase zone 58 of atom penetration into base metal again provided. The next successive layers deposited by high particulate energy level ion plating processes are a titanium carbide layer 59 to substantial thickness as much as, for example, 4 mils thickness, and finally a titanium nitride layer 60 to a thickness, for example, of approximately 10,000 angstroms. Phase zones 61 and 62 are also attained in the upper surface region of both the titanium film and titanium carbide layers.

With the film system of FIG. 6 using high particulate energy level ion plating processes a titanium layer 63 is deposited first over the base metal 64 to a thickness of approximately 2,000 angstroms with a phase zone 65 of atom penetration into base metal provided. The next successive layers deposited are titanium carbide layer 66 approximately 1 mil thick, a hafnium layer 67 approximately 2,000 angstroms thick, and finally a hafnnium carbide layer 68 as thick as, for example, from approximately 0.5 to 3 mils thick. Phase zones 69, 70 and 71 are also attained in the upper surface region of the titanium film, the titanium carbide film and the hafnium film, respectively.

In processing drill bit cones to provide an atomically dense coating of pure refractory material such as hafnium carbide with no binder as in FIG. 4, or graded shock resistant multi-layer film system such as chromium on the base metal and then successively titanium carbide and hafnium carbide (not shown) or the systems of FIGS. 5 and 6 the substrate (i.e., drill cone) is held at a high negative minus 3,000 to minus 5,000 volt charge during deposition. Material to be deposited is thermally evaporated into plasma at a pressure of about 25 microns. Atoms of evaporant are ionized in the plasma and being negatively charged are accelerated directly to the substrate. When a pure binary carbide is desired as a deposited film for the outside of a drill bit cone approximately a 50—50 mixture of argon gas and methane gas is leaked into the vacuum system and in combination becomes the plasma sustaining gas. The methane gas cracks into elemental carbon and hydrogen as it enters the plasma leaving the carbon free to react with the evaporated metal. It is of interest to note that the process is so controlled as to maintain a sufficiently high temperature at the upper atomic layer of the surface deposition to prevent hydrides from forming in thin films being deposited and the hydrogen is pumped away by the vacuum pump of the system. While the temperatures of the upper atomic layer of a thin film material being deposited is difficult to determine with any high degree of accuracy it appears that the temperature at that location would be above at least 1,000° C with atomic particle energy levels during deposition and is purposely maintained at a high level to prevent formation of undesired hydrides. Deposition rate is limited by the rate at which an evaporant may be evaporated that can be as high as 0.5 mil per minute and at times by the heat limit of the substrate object being ion plated. Thus, thick films of refractory materials can be grown as pure, uniform and atomically dense films several mils thick.

In order that the drill bits may be an optimumally balanced operational design improved lubrication of bearing surfaces is critically important, in addition to improved hardened film coated outer cone surfaces, particularly in the extremely harsh operational environment imposed on such roller cone hard rock drill bits. Referring to FIG. 7, a single thin film layer in the form of a dry lubricant film plating 72 is deposited on bearing surfaces of base metal 73 by a high particulate energy level sputtering or ion plating process. Molybdenum Disulphide ($MoS_2$) has been used as the dry lubricant film plating 72 to approximately 10,000 angstroms thickness and there is a phase zone 74 of atom penetration into base metal that helps anchor the dry lubricant in place and even with heavy friction loading still provides a high degree of lubricity. This thin film dry lubricant film plating has been applied to internal bearing surfaces of roller cones 11, 12, 23 and 23′, bearing surfaces of drill bit arm journals and bearing roller and ball components as well and has been found in some testing to result in extended bearing surface life ranging from twice to four times and more over bearings and bearing surfaces not so treated. This dry lubricity plating treatment of bearing surfaces makes a drill bit roller cone friction journal bearing mounting such as shown in FIG. 3 entirely feasable and actually a quite advantageous design approach. There is more journal bearing surface support and both journal bearing arm and roller cone may be structurally stronger units with more volume of support metal than with other bearing support designs for roller bit cones.

With the dry lubricant thin film approach of FIG. 8 a plurality of film layers is deposited successively over bearing surfaces of base metal by a high particulate energy level ion plating process with at least the top most layer a thin film of dry lubricant material. These dry lubricant materials include metals such as gold, silver, lead and tin as well as layered lattice inorganic compounds such as molybdenum disulphide. One film system in accord with the showing of FIG. 8 includes first a thin film deposit of chromium 75 to approximately 6,000 angstroms thickness on the base metal 76 and then a top layer of gold 77 approximately 4,000 angstroms thick. There is a phase zone 78 of atom penetration into the surface area of base metal 76 and a second phase zone 79 of atom penetration into the top surface area of the thin film of chromium. Should the thin film of gold be penetrated chromium oxide forms and continues to provide slippage or a thin film of chromium oxide could be initially provided between the thin films of chromium and gold or other dry lubricant material used in place thereof. These other dry lubricant thin film systems may be employed on any of the bearing surfaces such as described for the embodiment of FIG. 7.

Ion plating is an atomistic deposition process in which the substrate is subjected to a flux of high energy ions sufficient to cause appreciable sputtering before and during film deposition. The ion bombardment is usually done in a gas discharge system similar to that used in sputter deposition, except with ion plating the substrate is made a sputtering cathode. With ion bombardment for a thin film to form it is necessary that the deposition rate exceed the sputtering rate. Benefits with ion plating are an ability to sputter clean the substrate surface and keep it clean until the film begins to form, a high energy flux to the substrate surface giving a high surface temperature enhanced diffusion and chemical reactions without requiring bulk heating, altering the surface and interfacial structure, and physically mixing the film during film deposition. Ion plating offers fast deposition rates allowing thin film work in mils rather than solely angstroms and the throwing power imparted to atom ions in ion plating is far greater than with sputtering. This, advantageously facilitates coating larger irregularly shaped objects, internal diameters or convolutions with a uniformly deposited film in a range from extremely thin to thick films. A high particulate energy ion deposition process, of the type contemplated herein, is described in U.S. Pat. No. 3,329,601 to D. M. Mattox.

The thin film treatments herein described for drilling bits and drilling bit roller cones are also quite applicable to other material working tools requiring hardened dense tough working faces such as metal, wood and plastic working tools and others. The dry lubricant thin film plating treatments presented are quite useful for many other bearing uses in attaining increased bearing capacity and extended bearing life whether of sliding, ball and/or roller bearing construction.

Whereas this invention is illustrated and described with respect to a plurality of embodiments thereof, it should be realized that various changes may be made without departing from the essential contributions to the art made by the teachings hereof.

I claim:

1. A material working tool comprised of a plurality of successively overlying material films comprising a first material film overlying a tool core material and including an outer-surface-defining material film; each said film being deposited by a vacuum ion plating process, with material film atoms driven into the atomic lattice of the material which it overlies in a phase zone between that film and the material which it overlies comprised of atoms of that film and those of the material which it overlies; said first and successive overlying films comprising one of a group of materials consisting of pure metals, metal oxides, metal nitrides and metal carbides, each of said films comprised of a material, the hardness of which is greater than that of the material which it overlies.

2. The material working tool of claim 1, wherein said outer surface one of said films comprises a refractory material.

3. The material working tool of claim 2, wherein said outer surface one of said films comprises hafnium carbide.

4. The material working tool of claim 3, wherein the thickness of said outer surface one of said films is in the range of approximately 0.1 to 5 mils.

5. The material working tool of claim 1, with two films underlying said outer surface film and wherein the material comprising said films, comprise successively from said first one of said films, titanium, titanium carbide, and titanium nitride.

6. The material working tool of claim 1, with three films underlying said outer surface film and wherein the materials comprising said films, comprise successively from said first one of said films, titanium, titanium carbide, hafnium, and hafnium carbide.

7. The material working tool of claim 1, wherein said films range in thickness in a range extending approximately 500 angstroms to 6 mils.

8. The material working tool of claim 1, wherein said tool core material comprises tempered steel.

9. The material working tool of claim 1, with said tool comprising a drilling bit roller cone with said plurality of films deposited over the work face defining surfaces of said cone.

10. The material working tool of claim 9, with bearing support means in said roller cone having bearing surfaces comprised of a plurality of said successively overlying material films including a first material film overlying a roller cone bearing surface core material and an outer bearing surface one of said films, each said film being deposited by said vacuum ion plating process; and comprising a still further outermost bearing surface film of dry lubricant material deposited on said outer bearing surface one of said films by said vacuum ion plating process; and with atoms of said still further bearing surface film material driven into the atomic lattice of said outer bearing surface one of said films, in a phase zone between said still further film and said outer bearing surface one of said films.

11. The material working tool of claim 10, comprising friction journal bearing means upon which said roller cone is rotatably mounted; and with said friction journal bearing means having bearing surfaces comprised of a plurality of said successively overlying material films.

12. The material working tool of claim 1, with said tool rotatably mounted by bearing means having bearing surfaces; said bearing surfaces comprised of a plurality of said successively overlying material films including a first material film overlying a bearing surface core material and an outer bearing surface one of said films, each said film being deposited by said vacuum ion plating process; and a still further outermost film of dry lubricant deposited on said outer bearing surface one of said plurality of films by said vacuum ion plating process, with atoms of said still further film material driven into the atomic lattice of said outer bearing surface one of said films in a phase zone between said still further film and said outer bearing surface one of said films.

13. The material working tool of claim 12, wherein the material of which said still further outermost film is comprised is from the class of materials including gold, silver, lead and tin.

14. The material working tool of claim 12, wherein the material of which said still further outermost film is comprised, is molybdenum disulphide.

15. The material working tool of claim 12, wherein the material of which said still further outermost film is comprised is chromium oxide.

16. In a bearing support structure for a rotatably mounted device, bearing surfaces comprising a plurality of successively overlying material films including a first material film overlying a bearing surface core material and including an outer bearing surface one of said films; each said film being deposited by a vacuum ion plating process, with material film atoms of each of said films driven into the atomic lattice of the material which it overlies in a phase zone of intermingled atoms of that film and the material which it overlies; said first material film and successive overlying films comprising one of a group of materials consisting of pure metals, metal oxides, metal nitrides and metal carbides, with each one of said films, exclusive of said outer bearing surface one thereof, comprised of a material having a hardness greater than that of the material which it overlies; and said outer bearing surface film comprising a dry lubricant.

17. The bearing support sturcture of claim 16, wherein the material of which said outer bearing surface film is comprised is molybdenum disulphide.

18. The bearing support structure of claim 16, wherein the material of which said outer bearing surface film is comprised is from the class of materials including gold, silver, lead, and tin.

19. The bearing support structure of claim 16, wherein the material of which said outer bearing surface film is comprised is chromium oxide.

20. The bearing support structure of claim 16, wherein such plurality of films are defined by thin films of chromium over said bearing surface core material and gold over the thin film of chromium, with the gold thin film comprising said outer bearing surface film.

21. The bearing support structure of claim 20, with the thickness of said thin films of chromium and gold each being in the range of 500 to 6,000 angstroms.

22. The bearing support structure of claim 16, wherein the thickness of said outer bearing surface film is in the range of from 500 to 5,000 angstroms.

* * * * *